United States Patent [19]

Adams et al.

[11] Patent Number: 4,562,522

[45] Date of Patent: Dec. 31, 1985

[54] POWER SUPPLY FOR AN ELECTROSTATIC AIR CLEANER WITH A MODULATED PULSE WIDTH VOLTAGE INPUT HAVING A BACKUP PULSE WIDTH LIMITING MEANS

[75] Inventors: John T. Adams, Minneapolis; Arlon D. Kompelien, Richfield, both of Minn.

[73] Assignee: Honeywell Inc., Minneapolis, Minn.

[21] Appl. No.: 567,432

[22] Filed: Dec. 30, 1983

[51] Int. Cl.⁴ .............................................. B03C 3/66
[52] U.S. Cl. ...................................... 363/21; 55/105; 361/92; 361/235; 363/56
[58] Field of Search ............................ 363/21, 56, 80; 323/903; 55/105, 139; 307/11, 12; 361/79, 92, 235

[56] References Cited

U.S. PATENT DOCUMENTS

| | | | |
|---|---|---|---|
| 2,822,535 | 2/1958 | Fields | 55/139 |
| 3,143,403 | 8/1964 | Swensen | 55/156 |
| 4,318,168 | 3/1982 | Faxon | 363/56 |
| 4,410,934 | 10/1983 | Fathauer et al. | 363/21 |
| 4,447,841 | 5/1984 | Kent | 361/92 |

FOREIGN PATENT DOCUMENTS

| | | | |
|---|---|---|---|
| 14919 | 1/1982 | Japan | 363/21 |
| 40364 | 3/1982 | Japan | 363/21 |

Primary Examiner—William H. Beha, Jr.
Attorney, Agent, or Firm—Clyde C. Blinn

[57] ABSTRACT

A power supply usable with various size loads has an input circuit receiving pulses of voltage at 25 kilohertz. The pulses are modulated in width depending upon the input to a pulse-width modulation IC receiving inputs indicative of the output voltage and current delivered to the load. A backup current limiting circuit comprising a transistor which is biased by the voltage to the load, limits the signal to the pulse-width modulation IC to limit the width of the pulse to maintain the output current within limits.

4 Claims, 3 Drawing Figures 4,562,522

POWER SUPPLY FOR AN ELECTROSTATIC AIR CLEANER WITH A MODULATED PULSE WIDTH VOLTAGE INPUT HAVING A BACKUP PULSE WIDTH LIMITING MEANS

BACKGROUND AND SUMMARY OF THE INVENTION

Power supplies for ionization type loads such as electrostatic air cleaners have long been made by iron core and wire windings connected to a normal 110 volt 60 cycle voltage source. Such power supplies are not only expensive, but must be tailored to a particular load range.

The present invention is an improvement to a flyback bifilar primary winding transformer which is powered by a pulsating 25 kilohertz source to provide an output voltage to a load of a wide range such as various sizes of electrostatic air cleaners. The voltage output to the load is controlled by modulating the pulse width of the voltage input to the transformer depending upon the output voltage and current delivered to the load. The power supply has a backup overload sensing circuit for limiting the pulse width should the output current delivered to the load exceed some predetermined value.

DESCRIPTION AND OPERATION OF THE INVENTION

Figure 1:
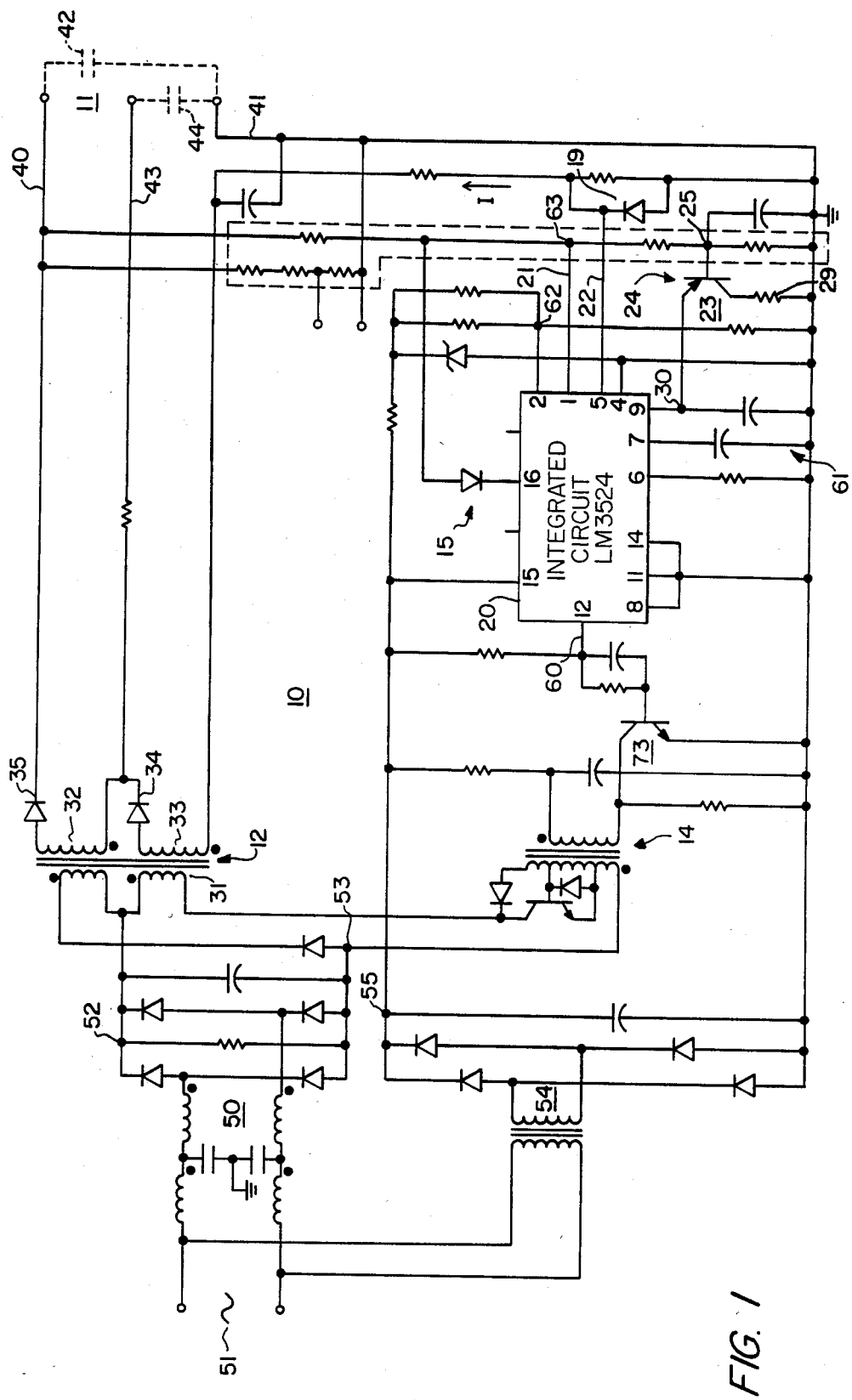
FIG. 1 is a circuit diagram of the power supply.

Referring to FIG. 1, a pulse-width modulation flyback transformer power supply 10 is dislosed for supplying power to a load 11 which might be an electrostatic air cleaner having an ionization or ionizer section or unit and a collector section or cell of the type shown in U.S. Pat. No. 3,143,403, issued Aug. 4, 1964, to Elmer H. Swensen. The output windings 32 and 33 of a flyback transformer 12 are connected to load 11. The transformer 12 is connected to the output of a pulse-width modulation isolation transformer 14 furnishing pulses at approximately 25 kilohertz of varying widths depending upon input signals to inputs 21 and 22 of a pulse with modulation IC 20. The input circuit 21 receives a signal indicative of the voltage output to load 11 over a voltage divider tap at 63. Input circuit 22 receives an output indicative of the current I of load 11.

The power supply has a reference voltage source in IC 20 for limiting the width of the pulse to transformer 12 and thus the output to load 11 for both a maximum voltage and a maximum current. The backup limiting circuit 23 comprises a transistor 24 which is biased by a voltage at 25. Upon a voltage appearing at 30 in excess of a desired voltage for a predetermined pulse width, transistor 24 conducts to ground through resistance 29 to limit the pulse width of isolation transformer 14 to transformer 12.

Specifically, transformer 12 has a bifilar primary winding 31 and a pair of secondary windings 32 and 33 which are interconnected with diodes 34 and 35 to supply voltage to load 11. When load 11 is an electrostatic air cleaner, the ionization unit is connected between conductor 40 and ground 41 producing a load 42.

The collector section is connected between conductor 43 and ground 41 producing a second load 44.

The input to transformer 12 is biased by a DC power supply 50 connected to a conventional alternating power source 51 to furnish approximately 180 volts DC between terminal 52 and 53. A second power supply 54 is also connected to AC source 51 and furnishes 15 volt DC at terminal 55 to various portions of the circuit of the power supply.

The output of the pulse-width modulating IC 20 (No. LM3524 manufactured by National Semiconductor) on conductor 60 is brought about by the combined effects of the input of the combined voltage and current signals and the 25 kilohertz oscillator controlled by capacitor 61. A transconductance error amplifier which combines the 2.9 volt reference at terminal 62 with input at 21 to provide a signal indicative of load voltage. A second transconductance error amplifier uses the input at 22 to provide a signal indicative of load current I. The combined amplifier signals provide an error signal 65, shown in FIG. 2, at 30 which combines with the 25 kilohertz oscillator to provide an output pulse schematically as shown in FIG. 2 as 70.

Figure 2:
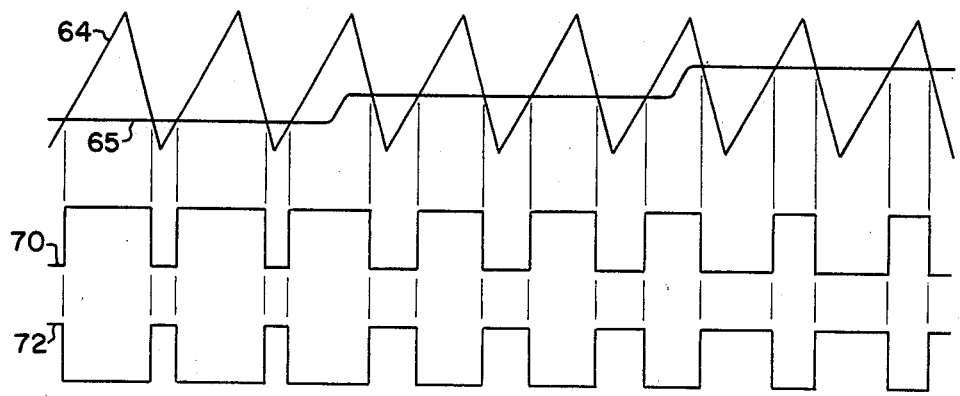
FIG. 2 is a graphical reprsentation of the voltages and pulse width modulation voltage of the power supply.

Specifically, referring to FIG. 2, the oscillator output is shown as the generated sawtooth voltage 64 and the error signal is shown by voltage 65 providing the pulse-width generated signal 70 from the IC 20 at conductor 60 of FIG. 1. In the circuit of FIG. 1 the transistor in an inversion circuit 73 reverses or inverts pulse-width signal 70 of FIG. 2 to the form shown as 72. This signal 70, when applied to the transformer 12 through isolation transformer 14, generates the output voltage to load 11.

Figure 3:
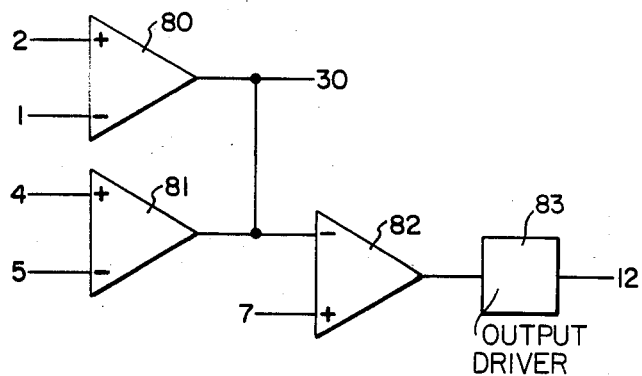
FIG. 3 is a circuit diagram of a portion of the integrated circuit.

As shown in FIG. 3, a portion of IC 20 is shown as in pages 1–115 of the 1980 Linear Databook of National Semiconductor. A transconductance error amplifier 80 receives inputs of reference 62 and voltage indicative signal at 21 and a transconductance error amplifier 81 receives inputs of a grounded reference and current indicative signal at 22. The error amplifier outputs 65 are combined at 30 to be compared by comparator 82 with the oscillator controlled by capacitor 61 whose output appears at 7. Comparator 82 has a pulsing output 70 through output driver 83 at 12. Normally the output to the load, which might range between 2.2 milliamperes to 0.2 milliamperes for various types of air cleaners is limited by the reference voltages at 21 and 22 to increase or decrease the pulse-width to transformer 12. This limits the voltage and/or current delivered to load 11 by the transformer 12.

Circuit 23 provides a backup to limit voltage and/or current delivered to the load. As previously mentioned, the combined error output voltage 65 can be limited by transistor 24 when the error voltage is applied to terminal 30. For a maximum power supply output at transformer 12, the maximum pulse-width, determined by error output 65 at 30, is known. Transistor 24 is biased by the voltage at 25 to cause responsive circuit 23 (of FIG. 1) to limit the voltage 65 (of FIG. 2) at 30. This limits the current output of transformer 12 to the load as a backup to the primary current limiter signal at 22. A rapid increase in the current at load 11 causes the reference voltage at 25 to decrease drastically limiting the pulse-width by shorting out the error voltage from terminal 30 to ground. Such a backup current limiting feature provides a safety feature to prevent a hazardous condition should portions of the normal voltage and current limiting circuit fail to limit the output of fly-back transfomer 12.

The embodiments of the invention in which an exclusive property or right is claimed are defined as follows:

1. In a power supply for an electrostatic air cleaner load comprising:
   a fly-back transformer having a bifilar input winding and two secondary windings, a first of said secondary windings being adapted to be connected across the collector cell and a second of said secondary windings being adapted to be connected across the ionizer unit,
   oscillator circuit means having a high frequency sawtooth output signal,
   normal error circuit means having an error output signal proportional to current and voltage outputs of said secondary windings,
   circuit means receiving said sawtooth output signal and said error output signal to produce a high frequency pulsing control signal having pulse lengths increasing with the magnitude of said error output signal,
   means connecting said pulsing control signal to said bifilar windings of said transformer, and
   backup responsive circuit means responsive to said error signal or an undervoltage signal of said secondary winding for maintaining said pulse lengths below a maximum value to limit the output current of said transformer or for reducing the output current.

2. The invention of claim 1 wherein
   said error output signal is a direct current voltage, and
   said backup responsive circuit means is a voltage limiter to limit said error signal voltage to limit the current to the air cleaner cell and ionizer unit.

3. In a power supply for an electrostatic air cleaner load comprising:
   a fly-back trasformer having a bifilar input winding and two secondary windings, a first of said secondary windings being adapted to be connected across the collector cell and a second of said secondary windings being adapted to be connected across the ionizer unit,
   oscillator circuit means having a high frequency sawtooth output signal,
   normal error circuit means having an error output signal proportional to current and voltage outputs of said secondary windings,
   circuit means receiving said sawtooth output signal and said error output signal to produce a high frequency pulsing control signal having pulse lengths increasing with the magnitude of said error output signal,
   means connecting said pulsing control signal to said bifilar windings of said transformer,
   backup responsive circuit means responsive to said error signal or an undervoltage signal of said secondary windings for maintaining said pulse lengths below a maximum value to limit the output current of said transformer, or for reducing the output current
   said error output signal is a direct current voltage,
   said backup responsive circuit means is a voltage limiter to limit said error signal voltage to limit the current to the air cleaner cell and ionizer unit, and
   said backup responsive circuit means is a transistor biased by a voltage proportional to the voltage output of said transformer so that upon the voltage of said transformer decreasing said pulse length is decreased to limit the output of said transformer.

4. The invention of claim 3 wherein said backup responsive circuit means is a secondary load current limiting means should said normal error circuit means fail to limit the output of said transformer.

* * * * *